United States Patent
Chiu

(10) Patent No.: US 10,250,725 B2
(45) Date of Patent: Apr. 2, 2019

(54) METHOD OF L2 LAYER DATA PACKET PROCESSING AND ELECTRONIC DEVICE USING THE SAME

(71) Applicant: Acer Incorporated, New Taipei (TW)

(72) Inventor: Chun-Yuan Chiu, New Taipei (TW)

(73) Assignee: Acer Incorporated, New Taipei (TW)

( * ) Notice: Subject to any disclaimer, the term of this patent is extended or adjusted under 35 U.S.C. 154(b) by 84 days.

(21) Appl. No.: 15/679,130

(22) Filed: Aug. 16, 2017

(65) Prior Publication Data

US 2018/0063300 A1    Mar. 1, 2018

Related U.S. Application Data

(60) Provisional application No. 62/378,650, filed on Aug. 23, 2016.

(51) Int. Cl.
| | |
|---|---|
| *H04W 28/02* | (2009.01) |
| *H04L 29/08* | (2006.01) |
| *H04W 28/06* | (2009.01) |
| *H04W 28/10* | (2009.01) |
| *H04L 1/00* | (2006.01) |
| *H04W 84/04* | (2009.01) |

(52) U.S. Cl.
CPC .............. *H04L 69/324* (2013.01); *H04L 1/00* (2013.01); *H04W 28/06* (2013.01); *H04W 28/10* (2013.01); *H04W 84/042* (2013.01)

(58) Field of Classification Search
CPC .................................................... H04W 28/02
See application file for complete search history.

(56) References Cited

U.S. PATENT DOCUMENTS

| | | | |
|---|---|---|---|
| 2010/0074222 A1 | 3/2010 | Wu | |
| 2010/0111032 A1* | 5/2010 | Wu | H04W 74/0833 370/331 |
| 2014/0293783 A1* | 10/2014 | Kang | H04B 7/026 370/230 |
| 2016/0234714 A1 | 8/2016 | Basu Mallick et al. | |

OTHER PUBLICATIONS

Qualcomm Incorporated, et al., "U-plane improvements for HW friendly implementations—UE TX side," 3Gpp TSG-RAN WG2 Meeting, Aug. 2016, pp. 1-5.

(Continued)

*Primary Examiner* — Ayanah S George
(74) *Attorney, Agent, or Firm* — JCIPRNET

(57) ABSTRACT

In an aspect, the disclosure is directed to a method and device for generating, by a higher L2 sublayer before receiving an UL grant, PDUs of the higher L2 sublayer, wherein each PDU of the higher L2 sublayer includes one or more SDUs of the higher L2 sublayer; generating, by a lowest L2 sublayer before receiving the UL grant, subheaders for each of SDUs of the lowest L2 sublayer, wherein each SDU of the lowest L2 sublayer is equivalent to each PDU of the higher L2 sublayer; performing, by the lowest L2 sublayer, a LCP procedure for the SDUs in response to receiving the UL grant; and generating, by the lowest L2 sublayer based on a result of the LCP procedure, a PDU of the lowest L2 sublayer by multiplexing a portion of the SDUs of the lowest L2 sublayer and the subheaders of the portion of the SDUs.

16 Claims, 10 Drawing Sheets

(56) References Cited

OTHER PUBLICATIONS

Intel Corporation, "User plane architecture options for NR," 3GPP TSG-RAN WG2 Meeting, May 2016, pp. 1-3.
"Search Report of Europe Counterpart Application", dated Nov. 20, 2017, p. 1-p. 10.
"3rd Generation Partnership Project; Technical Specification Group Radio Access Network; Study on Scenarios and Requirements for Next Generation Access Technologies; (Release 14)," 3GPP TR 38.913, V0.3.0, Mar. 2016, pp. 1-30.
"3rd Generation Partnership Project; Technical Specification Group Radio Access Network; Evolved Universal Terrestrial Radio Access (E-UTRA); Medium Access Control (MAC) protocol specification (Release 13)," 3GPP TS 36.321, V13.2.0, Jun. 2016, pp. 1-91.
"3rd Generation Partnership Project; Technical Specification Group Radio Access Network; Evolved Universal Terrestrial Radio Access (E-UTRA); Radio Link Control (RLC) protocol specification (Release 13)," 3GPP TS 36.322, V13.2.0, Jun. 2016, pp. 1-45.
Nokia, Alcatel-Lucent Shanghai Bell, "NR User Plane protocol stack considerations," 3GPP TSG-RAN WG2 Meeting #93bis, R2-162420, Apr. 11-15, 2016, pp. 1-3.
Intel Corporation, "Function split and evaluation criteria for NR user plane architecture," 3GPP TSG-RAN WG2 Meeting #94, R2-163588, May 23-27, 2016, pp. 1-5.
NTT Docomo, Inc., "Guidelines for radio protocol design to be captured in the TR," 3GPP TSG-RAN WG2 #94, R2-163979, May 23-27, 2016, pp. 1-2.

\* cited by examiner

METHOD OF L2 LAYER DATA PACKET PROCESSING AND ELECTRONIC DEVICE USING THE SAME

CROSS-REFERENCE TO RELATED APPLICATION

This application claims the priority benefits of U.S. provisional application Ser. No. 62/378,650, filed on Aug. 23, 2016. The entirety of the above-mentioned patent application is hereby incorporated by reference herein and made a part of this specification.

TECHNICAL FIELD

The disclosure is directed to a method of L2 layer data packet processing and an electronic device using the same method.

BACKGROUND

The next generation mobile communication system such as a 5G New Ratio (NR) communication system will impose a more stringent requirement for user plane latency (TR 38.913) than previous predecessors. User plane latency can be defined as the time it takes to successfully deliver an application layer packet or message from a radio protocol layer 2/3 service data unit (SDU) ingress point to a radio protocol layer 2/3 SDU egress point via a radio interface in both uplink and downlink directions, where neither the reception of a mobile device nor a base station is restricted by discontinuous reception (DRX). For ultra-reliable low latency communication (URLLC) case, the target for user plane latency would be around 0.5 ms for uplink (UL) and 0.5 ms for downlink (DL). For enhanced mobile broadband (eMBB), the target for user plane latency would be around 4 ms for UL, and 4 ms for DL.

The reduction of user plane latency could be accomplished by reducing the response time between receiving an uplink grant and transmitting uplink packets which correspond to the uplink grant. FIG. 1 illustrates conventional transmission of UL packets in response to receiving a UL grant from a downlink control info illation (DCI). According to FIG. 1, from the end (101) of a DL reception of DCI which contains a UL grant to the beginning (102) of transmissions of the corresponding UL transport blocks, there could only be a delay ($T_{DL->UL}$) of 1-2 orthogonal frequency division multiplexing (OFDM) symbol durations in order to be within the required user plane latency.

There are several drawbacks of current L2 layer processing in the current Long Term Evolution (LTE) communication system. In order to perform transport block (TB) fillings, radio link control (RLC) and medium access control (MAC) protocol data units (PDUs) are generally not generated before receiving a UL grant which is for transmitting the TB. After receiving a UL grant, the L2 layer would need to process data packets of all sizes and then determine how to full up a TB as some of the data packets that are longer would need to be segmented, and some of the data packets that are less than a TB would need to be concatenated with other data packets. However, this process is quite complex because of the current logical channel prioritization (LCP) and RLC concatenation/(re-)segmentation principles. Because quality of service (QoS) requirement could be different for different channels, each channel may need to perform a different RLC concatenation/segmentation procedure. The LCP procedure is complex and cannot commence until the UL grant has been received, and thus the current LCP procedure is unlikely to achieve the required user plane latency.

The current LCP in a LTE communication system is briefly introduced as follows. First, through RRC signaling, parameters for each logical channel could be defined, and such parameters may include not limited to 'Priority', 'prioritisedBitRate' (PBR), and 'bucketSizeDuration' (BSD). The parameter 'Priority' is an integer with lower number specifying higher priority for a logical channel. PBR specifies a constant bit rate per transmission time interval (TTI) for the logical channel. BSD specifies the upper limit of a duration of a data packet for the logical channel.

MAC maintains a variable Bj (in bits) for each logical channel j. The parameter Bj would be initialized as zero and subsequently incremented by the product as the result of PBR multiplied (×) by the duration of TTI for each TTI. If Bj>PBR×BSD, then Bj would be set to be equal to PBR× BSD. Typically, the Bj grows by the size of PBR per TTI.

The current LCP procedure could be characterized as to contain these three steps. During step 1, all the logical channels with Bj>0 are allocated resources in a decreasing priority order. In other words, a logical channel with a higher priority would be allocated with resources for transmission before a logic channel with a lower priority. If the PBR of a logical channel is set to "infinity", the MAC entity would allocate resources for all the data that is available for transmission on the logical channel before meeting the PBR of the lower priority logical channel(s). During step 2, the MAC entity would decrement Bj by the total size of MAC SDUs served to the logical channel j during step 1. Note that the Bj can be negative since the UE would generally not segment a RLC service data unit (RCL SDU) if the whole SDU fits into the remaining resources. During step 3, if any resources remain, all the logic channels are served in a strict decreasing priority order regardless of the value of Bj.

FIG. 2 shows an example of a conventional LCP according to established RLC concatenation and segmentation principles. The example of FIG. 2 contains hypothetically three logical channels, namely, LCH 1, LCH2, and LCH3 as LCH 1 has higher priority than LCH 2 which has high priority than LCH 3. The RLC SDUs (e.g. RLC SDU 1, RLC SDU 2, etc.) stands for data packets that are not yet processed by LCP. For LCH 1, after TTI=1, B1=PBR 1 which means that RLC SDU 1 and a portion of RLC SDU 2 would need to be transmitted but not yet transmitted. After TTI=2, B1 would include the first three RLC SDUs and a portion of the fourth RLC SDU which would need to be transmitted but not yet transmitted. The same could be described for B2 of LCH 2 and B3 of LCH 3.

Suppose that after TTI=1, a UE has received an uplink grant for transmitting RLC SDUs, then the UE would look for the logical channel with the highest priority and with Bj>0 which in this example is LCH 1. Next the UE would instruct LCH 1 to start transmitting packet; however, LCH 1 would always transmit a complete packet. Even though B1 would grow to include a portion of RLC SDU 2 of LCH 1 after TTI=1, in order to avoid segmentation, the MAC of UE would instruct the UE's RLC entity to transmit the entire RLC SDU 1 of LCH 1 and the entire RLC SDU 2 of LCH 1 to be contained within a first RLC PDU.

Next, the UE would look for the logical channel having the next priority and with Bj>0 which is LCH 2 in this example. Even though B2 would grow to include a portion of RLC SDU 2 of LCH 2 after TTI=1, in order to avoid segmentation, the MAC of UE would instruct the UE's RLC entity to transmit the entire RLC SDU 1 of LCH 2 and the entire RLC SDU 2 of LCH 2 to be contained within a second RLC PDU. Next, the UE would look for the logical channel having the next priority and with Bj>0 which in this example is LCH 3. However, even though B3 has grown to contain RLC SDU 1 of LCH 3 and a portion of RLC SDU 2 of LCH 3, in this example the TB has become full and cannot contain the entirety of RLC SDU 2 of LCH 3 and thus segmentation is required. This means that the remaining portion of RLC SDU 2 of LCH 3 will be transmitted in the next TB.

However, suppose that the TB is actually able to contain both the entirety of RLC SDU 1 of LCH 3 as well as the entirety of RLC SDU 2 of LCH 3, and there are no other channels with a lower priority than LCH 3, then the UE would look to fill the TB by obtaining data from the channel with the highest priority (e.g. RLC SDU 3 of LCH 1, RLC SDU 4, and etc.).

After LCP is complete, then the UE would go ahead and make RLC PDUs and MAC PDU. The RLC PDUs would involve concatenation/segmentation of RLC SDUs and also re-segmentation of RLC data PDUs. The making of MAC PDU would involve creating a MAC header which has of one or more MAC subheaders. Each of the subheaders corresponds to each of the MAC SDUs. Afterwards, paddings of the MAC PDU may need to be performed. Based on the above described process of LCP and the making of RLC PDUs and MAC PDU, it is highly unlikely that the user plane latency can be reduced to 1 or 2 OFDM symbols.

SUMMARY OF THE DISCLOSURE

Accordingly, the disclosure is directed to a method of L2 layer data packet processing and an electronic device using the same method.

In an aspect, the disclosure is directed to a method of L2 layer data packet processing implemented by an electronic device, and the method would include not limited to: generating, by a higher L2 sublayer before receiving an uplink (UL) grant, protocol data units (PDUs) of the higher L2 sublayer, wherein each PDU of the higher L2 sublayer includes one or more SDUs of the higher L2 sublayer; generating, by a lowest L2 sublayer before receiving the UL grant, subheaders for each of service data units (SDUs) of the lowest L2 sublayer, wherein each SDU of the lowest L2 sublayer is equivalent to each PDU of the higher L2 sublayer; performing, by the lowest L2 sublayer, a logical channel prioritization (LCP) procedure for the SDUs in response to receiving the UL grant; generating, by the lowest L2 sublayer based on a result of the LCP procedure, a PDU of the lowest L2 sublayer by multiplexing a portion of the SDUs of the lowest L2 sublayer and the subheaders of the portion of the SDUs; and modifying, by the lowest L2 sublayer, the last subheader within the PDU.

In an aspect, the disclosure is directed to an electronic device which includes not limited to a receiver and a processor coupled to the receiver and configured to: generate, by a higher L2 sublayer before receiving an uplink (UL) grant, protocol data units (PDUs) of the higher L2 sublayer, wherein each PDU of the higher L2 sublayer includes one or more SDUs of the higher L2 sublayer; generate, by a lowest L2 sublayer before receiving the UL grant, subheaders for each of service data units (SDUs) of the lowest L2 sublayer, wherein each SDU of the lowest L2 sublayer is equivalent to each PDU of the higher L2 sublayer; perform, by the lowest L2 sublayer, a logical channel prioritization (LCP) procedure for the SDUs in response to receiving the UL grant; generate, by the lowest L2 sublayer based on a result of the LCP procedure, a PDU of the lowest L2 sublayer by multiplexing a portion of the SDUs of the lowest L2 sublayer and the subheaders of the portion of the SDUs; and modify, by the lowest L2 sublayer, the last subheader within the PDU.

In order to make the aforementioned features and advantages of the disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the disclosure and is therefore not meant to be limiting or restrictive in any manner. Also the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
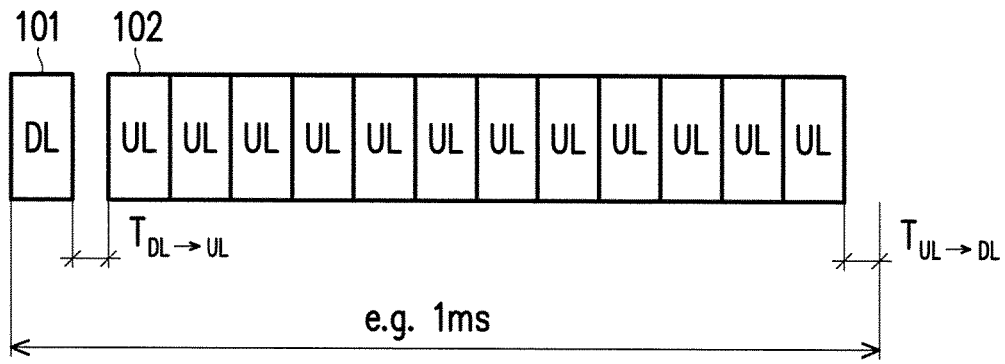
FIG. 1 illustrates conventional transmission of UL packets in response to receiving a UL grant from a DCI.
Figure 2:
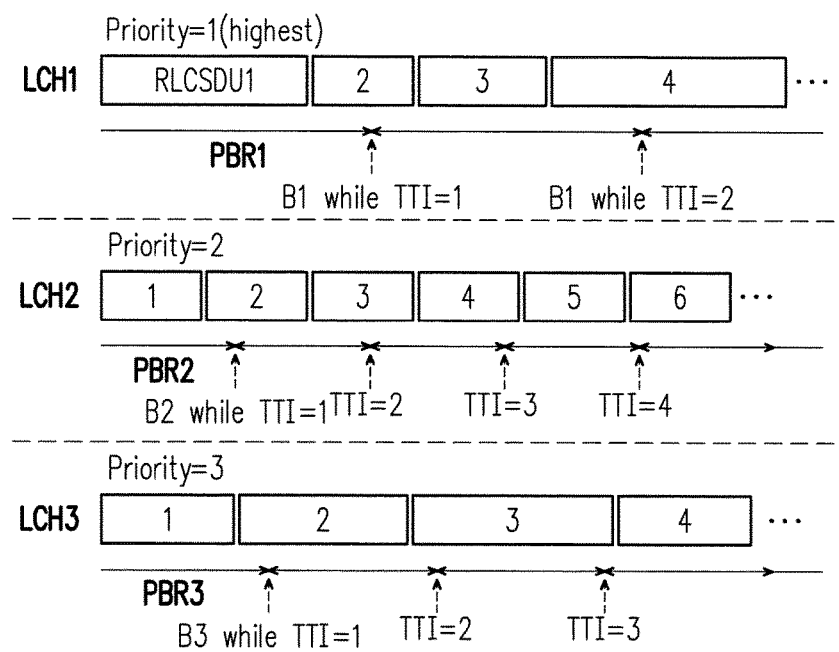
FIG. 2 shows an example of a conventional logical channel prioritization (LCP) according to established RLC concatenation and segmentation principles.

Reference will now be made in detail to the present exemplary embodiments of the disclosure, examples of which are illustrated in the accompanying drawings. Wherever possible, the same reference numbers are used in the drawings and the description to refer to the same or like parts.

The disclosed method of L2 layer data packet processing and an electronic apparatus using the same method may include any one or a combination of these three features. (1) The disclosure proposes performing real-time (RT) segmentation at the lowest L2 sublayer to minimize the RT processing time. For UL communications, RT segmentation of data packet does not occur until the required UL grant has been received.

(2) The disclosure proposes performing non-RT (NRT) segmentation or concatenation (S/C) at higher L2 sublayer to reduce header overhead and to resolve the problem of data packet with huge sizes. Before RT Segmentation, all packets which may vary in sizes in the higher L2 sublayer are segmented into data packets of uniform sizes by NRT segmentation in the higher L2 sublayer. (3) The disclosure proposes that each logical channel can be configured with different treatments by upper layer (e.g. RRC) and a flexible header design for the lowest L2 sublayer is proposed to support multiplexing/demultiplexing of those logical channels.

One of the main objective of this disclosure is that, for UL transmission, RLC and MAC PDU can be generated before the reception of the UL grant to minimized real-time L2 layer processing time.

NRT segmentation/concatenation is defined as segmentation/concatenation that is performed with a pre-configured PDU size. In this disclosure, if NRT segmentation/concatenation is applied, it is always performed at the higher L2 sublayer.

RT segmentation/concatenation is defined as segmentation/concatenation that is performed according to the result of LCP. In this disclosure, if RT segmentation/concatenation is applied, it is always performed at the lowest L2 sublayer.

Figure 3A:
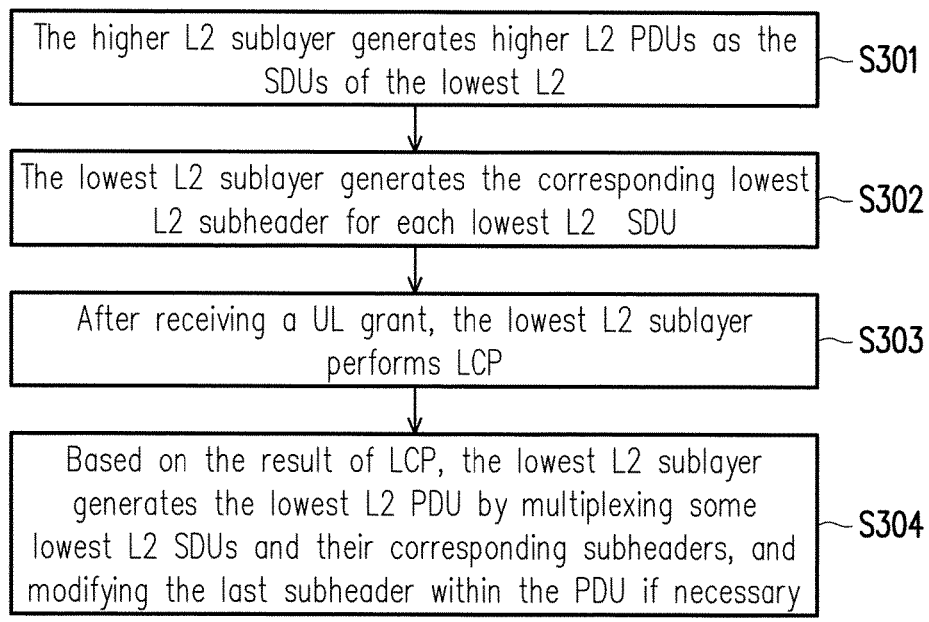
FIG. 3A illustrates a method of L2 layer data packet processing in accordance with one of the exemplary embodiments of the disclosure.
Figure 3B:
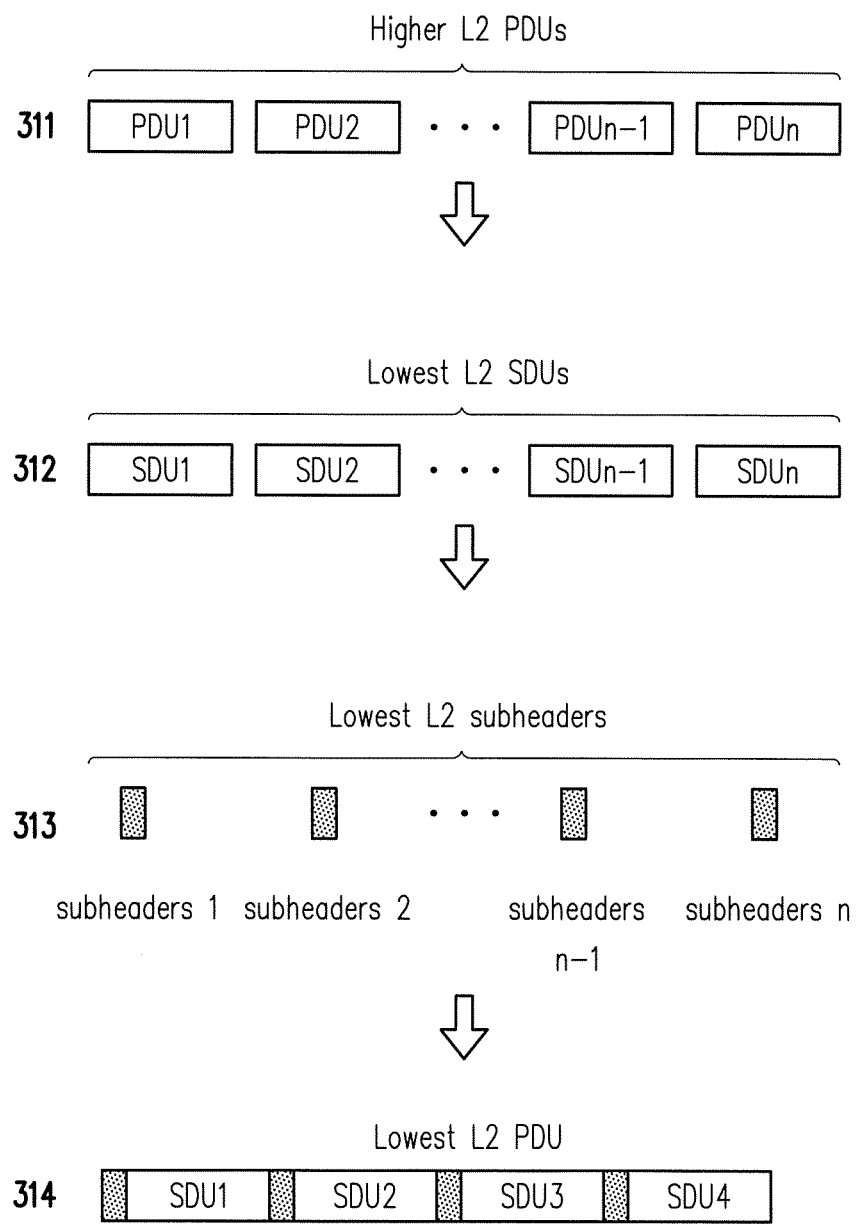
FIG. 3B illustrates generating lowest L2 layer PDU and subheaders in accordance with one of the exemplary embodiments of the disclosure.

FIG. 3A illustrates a method of L2 layer data packet processing in accordance with one of the exemplary embodiments of the disclosure. All the exemplary embodiments of the disclosure would perform all the steps as described in FIG. 3A. FIG. 3B illustrates generating lowest L2 layer PDU and subheaders in accordance with one of the exemplary embodiments of the disclosure. FIG. 3A and FIG. 3B will be referred together in the follow description. In step S301, the higher L2 sublayer generates higher L2 PDUs (311) as the SDUs (312) of the lowest L2 sublayer. In step S302, the lowest L2 sublayer generates the corresponding lowest L2 sublayer subheader (313) for each lowest L2 SDU. In step S303, after receiving a UL grant, the lowest L2 sublayer performs LCP. In step S304, based on the result of the LCP, the lowest L2 sublayer generates the lowest L2 PDU (314) by multiplexing some lowest L2 SDUs and their corresponding subheaders, and if necessary, modifying the last subheader (315) within the PDU (314).

Figure 4:
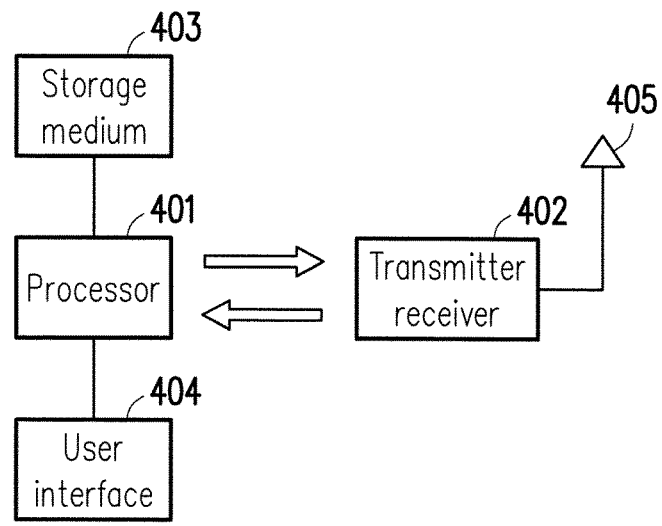
FIG. 4 illustrates the hardware diagram of an electronic device that uses the method of L2 layer data packet processing in accordance with one of the exemplary embodiments of the disclosure.

FIG. 4 illustrates the hardware diagram of an electronic device that uses the method of L2 layer data packet processing in accordance with one of the exemplary embodiments of the disclosure. The electronic device in this disclosure could be a mobile station, an advanced mobile station (AMS), a server, a client, a desktop computer, a laptop computer, a network computer, a workstation, a personal digital assistant (PDA), a tablet, a scanner, a (smart) telephone device, a watch, a pager, a camera, a television, a hand-held video game device, a musical device, a wireless sensor, a drone, and the like. In some applications, the electronic device may be a fixed computer device operating in a mobile environment, such as a bus, a train, an airplane, a boat, a car, and so forth.

The structure of the electronic device would include not limited to a processor (401) coupled to a transmitter and/or receiver (transceiver) (402), a storage medium (403), and optionally a user interface (UI) (404) which may or may not contain a display. The transmitter and/or receiver (402) are controlled by the processor (401) to down-convert radio frequency signals (RF) (or millimeter wave signals) received from an antenna (array) (405) into baseband signals to be processed by the processor (401) and are controlled by the processor (401) to up-convert baseband signals into RF or millimeter wave signals to be transmitted through the antenna (array) (405). The transmitter and/or receiver (402) may also include one or more sets of hardware tuned to different frequency bands such as RF frequency, millimeter frequency, Bluetooth frequency, Wi-Fi frequency, and so forth. The storage medium (403) contains temporary and/or permanent storage medium for storage of temporarily buffered data or for permanent (non-volatile) data storage. The processor (401) would include one or more may include one or more hardware processing units such as processors, controllers, or discrete integrated circuits to implement the disclosed method of L2 layer data packet processing.

Figure 5:
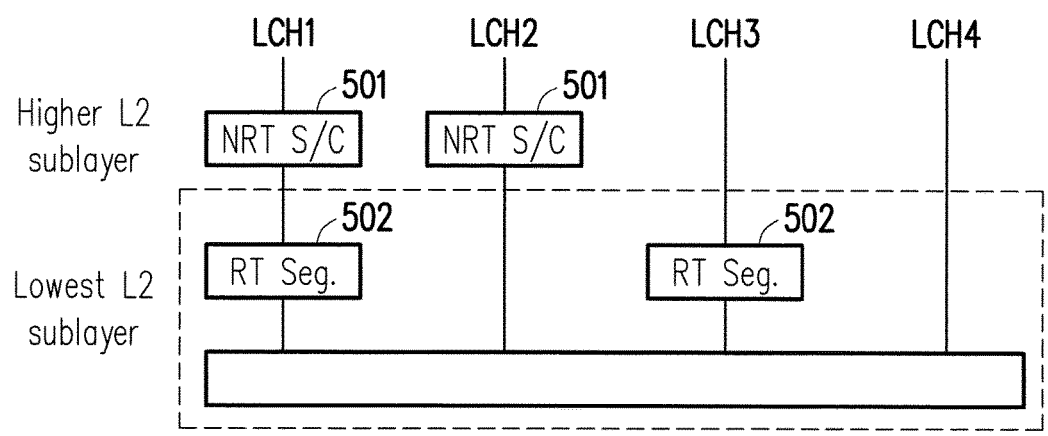
FIG. 5 illustrates different L2 data packet processing treatments for each of different logical channels in accordance with one of the exemplary embodiments of the disclosure.

To further elucidate the above described method and electronic device, the disclosure provides five exemplary embodiments. FIG. 5 illustrates an example of different L2 data packet processing treatments for each of different logical channels before multiplexing/demultiplexing of MAC SDUs. For the disclosure, NRT segmentation/concatenation (501) is always performed in the higher L2 sublayer, and RT segmentation (502) is always performed in the lowest L2 sublayer. For the first exemplary embodiment, segmentation or concatenation is not performed, as shown by the treatment for LCH 4 for example. For the second exemplary embodiment, NRT segmentation/NRT concatenation (501) is performed, as shown by the treatment for LCH 1 and LCH2 for example. For the third exemplary embodiment, RT segmentation (502) is performed but not concatenation, as shown by LCH 1 and LCH3 for example. For the fourth exemplary embodiment, both the NRT (501) segmentation/concatenation and RT segmentation are performed, as shown by LCH 1 for example. For the fifth exemplary embodiment, each of logical channels can be configured with a different treatment such as any one of the first~fourth exemplary embodiments as shown by FIG. 5 which shows that each of the logical channels has a different treatment.

It is worth noting that the disclosure is not concerned with the cases of applying RT concatenation because the gain is minor while multiplexing was already applied at the lowest L2 sublayer. Also, the disclosure is not concerned with the cases of only applying NRT segmentation or only applying NRT concatenation because it would be beneficial to shape packet sizes to meet the PBR by using both NRT segmentation and NRT concatenation.

For the first exemplary embodiment (e.g. LCH 4 of FIG. 5), in the (at least one) higher L2 sublayer, there is neither segmentation nor concatenation. In the higher L2 sublayer before receiving the UL grant associated with uplink data packets to be transmitted, higher layer PDUs (e.g. RLC PDU) can be generated from the uplink data packets, and MAC SDUs can be generated based on the higher layer PDUs.

Figure 7:
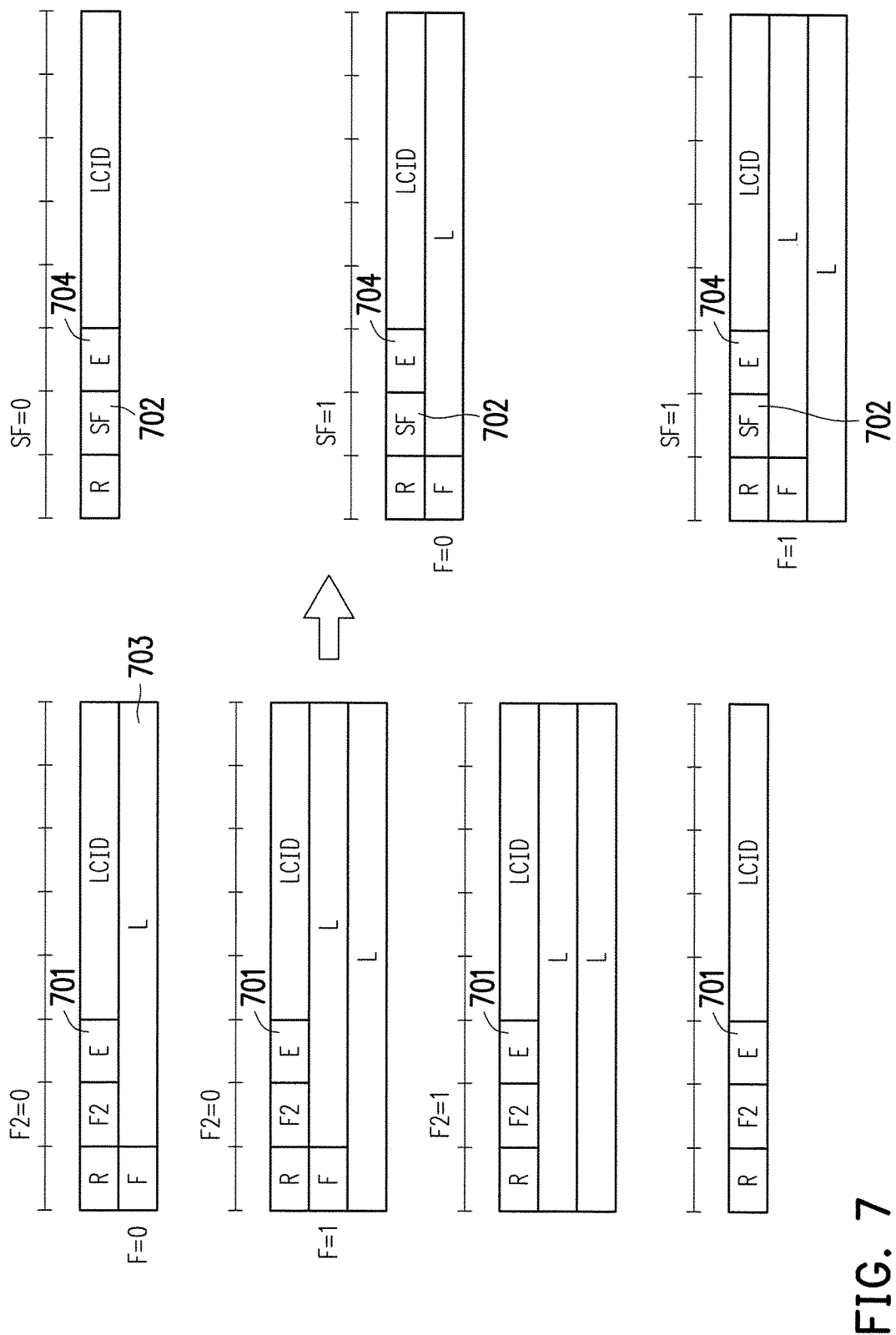
FIG. 7 illustrates an example of MAC subheaders for the first exemplary embodiment and MAC subheaders for the second exemplary embodiment.

In the lowest L2 sublayer (e.g. MAC layer), the current LTE MAC header and subheader format which is shown in the left column of FIG. 7 could be reused except that the number of bits of each field of subheaders can be different. Since MAC SDUs would also be generated before the reception of the UL grant, and there is neither segmentation nor concatenation at lowest L2 sublayer, the MAC subheader of each MAC SDU can also all be automatically generated with extension field (E) field (701)=1 before reception of UL grant.

After receiving the UL grant, the following process would be performed in real time. If the MAC PDU is all filled, then no padding bits would be needed. If no padding bits are needed, the value of E field (701) of the last subheader in MAC PDU would be changed from 1 to 0 after LCP. If padding bits are needed however, padding pads would be generated by filling the unused portion of the MAC PDU with zero's, and padding subheader would generated so that the MAC PDU containing padding bits would be known.

The LCP procedure would follow the current LTE LCP procedure until a MAC SDU cannot be filled in a TB. When such event occurs, there could be two alternatives. The first alternative is to use padding bits to fill the TB without any optimization. For the second alternative, when a MAC SDU which belongs to a logical channel with priority i cannot be filled in a TB, the LCP would try to find other MAC SDUs to minimize the needed padding bits. The process of finding the above described 'other MAC SDUs' could be based on the following three rules. Rule (1): for each logical channel, strictly comply with packet sequences. Rule (2): consider with the priority of each logical channel. Rule (3): consider with a limitation of each logical channel such as the future value of Bj.

Figure 6:
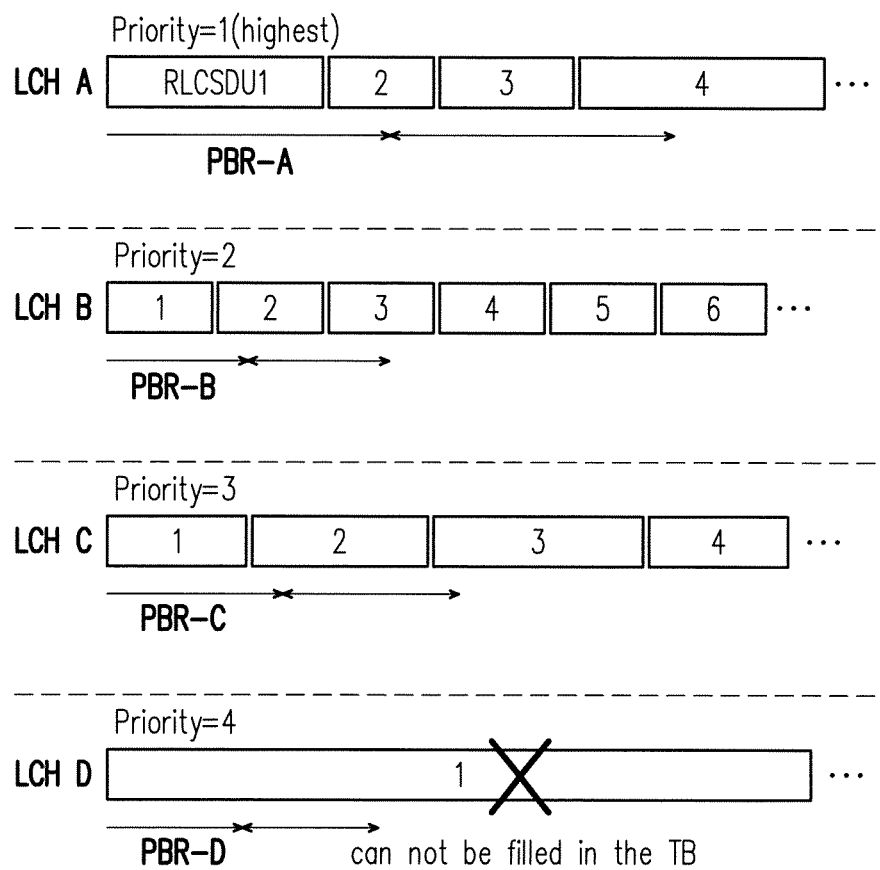
FIG. 6 illustrates an example of the second alternative embodiment of the first exemplary embodiment.

An example of the second alternative embodiment of the first exemplary embodiment is shown in FIG. 6 which operates as follows. It is supposed that there are four logical channels, LCH A, LCH B, LCH C, LCH D, and each logical channel has a different priority in the descending order and has a number of MAC SDU to be filled in a TB. When packet 1 of LCH D cannot be filled in the TB, according to Rule 2, LCP would attempt to fill the TB with packet 3 of LCH A. If there is still space available, according to Rule 2 and Rule 1, LCP would attempt to fill the TB with packet 4 of LCH A. When the limitation of LCH A is reached, according to Rule 3, LCP would suspend the filling of the TB with other following packets of LCH A. Instead, LCP would attempt to fill the TB with packet 3 of LCH B according to Rule 2. If packet 3 cannot be filled in the TB, according to Rule 1, LCP cannot fill the TB with other following packets of LCH B.

The advantage of first exemplary embodiment is that the user plane latency is good as RT processing is minimized in exchange for larger MAC header overheads and padding overhead since there is no concatenation and segmentation at L2 sublayers.

For the second exemplary embodiment (e.g. LCH 2 of FIG. 5), in addition to the steps as described in FIG. 3A, the procedures in higher L2 layer would involve NRT segmentation/NRT concatenation (501) which is performed in the higher L2 sublayer. The higher L2 sublayer would generate fixed sized PDUs by performing segmentation or concatenation of uplink data packets before the UL grant associated with the uplink data packets is received. Also, MAC SDUs can be generated based on the PDUs before the reception of the UL grant.

As for the procedures in the lowest L2 sublayer which could be the MAC layer, the MAC subheader which corresponds to each MAC SDU could be generated before the reception of the UL grant. The MAC header and subheader format could be similar to existing LTE MAC header and subheader format which is shown in the left column of FIG. 7. The right column of FIG. 7 shows MAC header and subheader format of the second exemplary embodiment which does not require the length (L) field (703) since the PDU size is already configured by the upper layer and hence known. (Although only 1 'L' is labelled in FIG. 7, the label (703) would apply to all instances of 'L'.) However, the number of bits of each field could be different. A special size flag (SF) field (702) could be included in MAC subheader to indicate whether a MAC SDU has special size. Further, the MAC subheader of each MAC SDU would also be generated by automatically setting E field (704)=1 before the reception of the UL grant.

After the UL grant is received, the following process is all performed in RT. RT segmentation is not needed as shown in LCH 2 of FIG. 5. If the MAC PDU is all filled, then no padding bits would be needed. If no padding bit is needed, the value of the E field (704) of the last subheader in the MAC PDU would be changed from 1 to 0 after LCP is complete. If padding bits are needed, the padding subheader and padding bits would be generated. The LCP procedure would be the same as the first exemplary embodiment.

The advantage of the second exemplary embodiment would mainly be that the RT processing is minimized in exchange for larger header overhead. The header overhead could be improved under the circumstance in which the majority of traffic types are small data. It is also worth noting that, for each logical channel, the configured fixed PDU size can be equal to the PBR. The padding overhead may be reduced by the diversity of PDU size. There may be no need to have padding if the UL resource is allocated based on the per-LCH buffer status report (BSR).

For the third exemplary embodiment (e.g. LCH 3 of FIG. 5), there is no segmentation/concatenation in the (at least one) higher L2 sublayer, but the lowest L2 sublayer would perform RT segmentation. In the higher L2 sublayer before receiving the UL grant associated with uplink data packets to be transmitted, higher layer PDUs (e.g. RLC PDU) can be generated from the uplink data packets, and MAC SDUs can be generated based on the higher layer PDUs. Without NRT segmentation/concatenation, the procedure in the higher L2 sublayer would be the same as the first exemplary embodiment.

Figure 8:
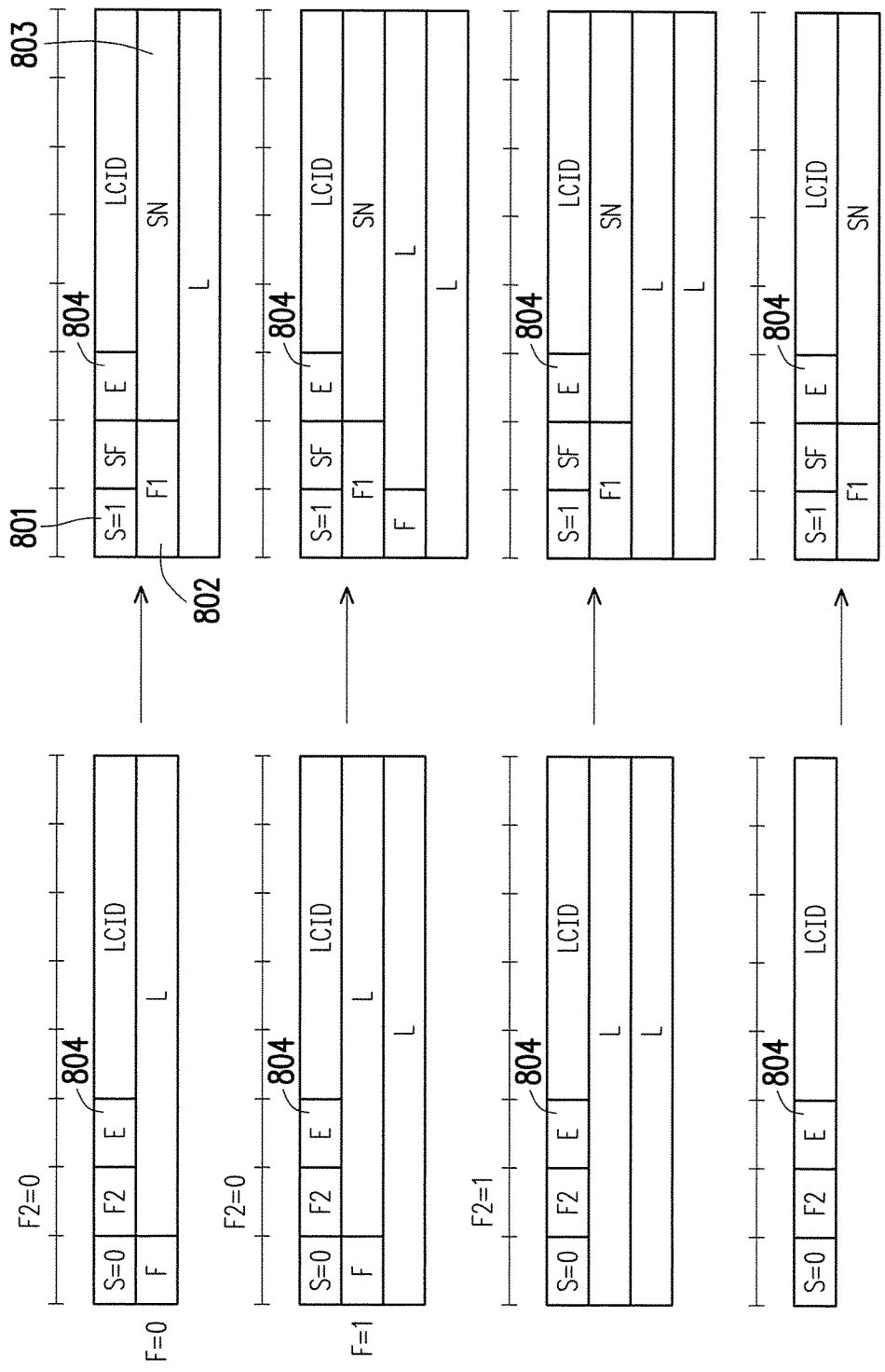
FIG. 8 illustrates MAC subheaders for non-segmented MAC SDU and MAC subheaders for segmented MAC SDU based on the third exemplary embodiment.

As for the procedure in the lowest L2 sublayer which could be the MAC layer,

RT segmentation would be performed. Before the UL grant is received, the MAC header and subheaders would be generated, and the subheader format could be the same as the current LTE MAC header and subheader format except that the number of bits of each field could be different. However, the third exemplary embodiment proposes a new MAC subheader format which contains some optional changes to the existing MAC header and the subheader format which is shown in FIG. 8. The new MAC subheader would be later on be generated after the UL grant is received to replace the MAC subheader that has already been generated only for MAC SDUs that are to be segmented. The new MAC subheader format does not apply to MAC SDUs that are not to be segmented in RT. The left side of FIG. 8 shows the current LTE MAC subheader format whereas the right side of FIG. 8 shows four new optional subheader format of the third exemplary embodiment.

Optionally, the reserve (S) field 801 could be used to indicate whether a MAC SDU is segmented. The optional frame information (FI) field 802 could be used to indicate the mapping relationship between RLC SDUs 904 and RLC PDUs 905 so as to indicate whether a MAC SDU is segmented at the beginning and/or at the end. The sequence number (SN) 803 to indicate the sequence number of segmented MAC SDU so that segmented data packets could be tracked. Before receiving the UL grant, the MAC subheader of each MAC SDU (and segmented MAC SDU) would be generated with E field 804 automatically set to 1.

Figure 9:
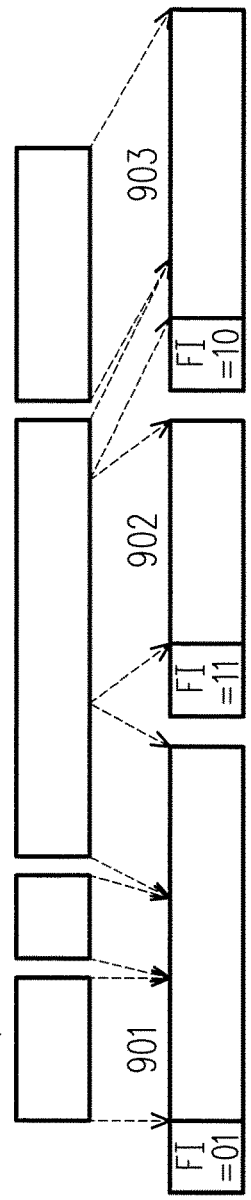
FIG. 9 contains a description for FI field and an example of using the FI field in accordance with the third exemplary embodiment.

As shown in FIG. 9, the FI field 802 may contain two-bits with 00 to indicate the first byte of the RLC PDUs to correspond to the first byte of RLC SDU and last byte of the RLC PDU to correspond to the last byte of RLC SDU, 01 to indicate the first byte of the RLC PDUs to correspond to the first byte of RLC SDU and last byte of the RLC PDU does not correspond to the last byte of RLC SDU, 10 to indicate the first byte of the RLC PDUs does not correspond to the first byte of RLC SDU and last byte of the RLC PDU to correspond to the last byte of RLC SDU, and 11 to indicate the first byte of the RLC PDUs does not correspond to the first byte of RLC SDU and last byte of the RLC PDU does not correspond to the last byte of RLC SDU.

From the example of FIG. 9, it can be seen that the first byte of the first RLC PDU 901 corresponds to the first byte of a RLC SDU, but the last byte of the first RLC PDU 901 does not correspond to the last byte of the RLC SDU and thus the first RLC PDU 901 would be associated with bits 01 for the FI field 802. The first byte of the second RLC PDU 902 does not correspond to the first byte of a RLC SDU and the last byte of the RLC PDU 902 does not correspond to the last byte of the RLC SDU and thus the second RLC PDU 902 would be associated with bits 11 for the FI field 802. The first byte of the third RLC PDU 903 does not correspond to the first byte of RLC SDU and last byte of the third RLC PDU 903 corresponds to the last byte of the RLC SDU and thus the third RLC PDU 903 would be associated with bits 10 for the FI field 802.

After the UL grant is received, the RT processing is to be performed as described in the following. The LCP procedure would be performed to determine whether RT segmentation would be required. The LCP procedure could be the same as the current LTE LCP procedure. After the LCP procedure, if segmentation of a MAC SDU is deemed required, then a new MAC subheader would be generated to replace the original subheader with the MAC subheader of the segmented MAC SDU; otherwise, the original MAC subheader is retained for MAC SDUs that are not segmented. If padding is deemed as needed, padding subheader and padding bits would be generated. If padding is not deemed necessarily, the E field 804 of the last subheader in the MAC PDU would be changed from 1 to 0 to indicate that the subheader corresponds to the last MAC SDU within the MAC PDU.

The advantages of the third exemplary embodiment would include good user plane latency in exchange for larger header overhead. The padding overhead would be minimal as no padding bits are needed while RT segmentation is performed. It is also worth noting that at most two segmented MAC SDUs are generated by a segmentation operation. At most one segmentation operation is performed for a TB. Thus, the average number of segmented MAC SDU would be less than two in a TB. The additional overhead required in the MAC subheader for a segmented MAC SDU is only 1 byte as 2 bits are used for FI 802 and 6 bits are used for SN 803.

The fourth exemplary embodiment (e.g. LCH 1 of FIG. 5) is based on a combination of the second exemplary embodiment and the third exemplary embodiment. In addition to the steps as described in FIG. 3A, the fourth exemplary embodiment would include performing NRT segmentation/concatenation as well as RT segmentation. In higher L2 sublayer, fixed sized PDUs would be generated by performing NRT segmentation/concatenation, and the size of the PDUs is configured by the upper layer such as by RRC signaling. The PDUs would be generated as MAC SDUs before the reception of UL grant.

Figure 10:
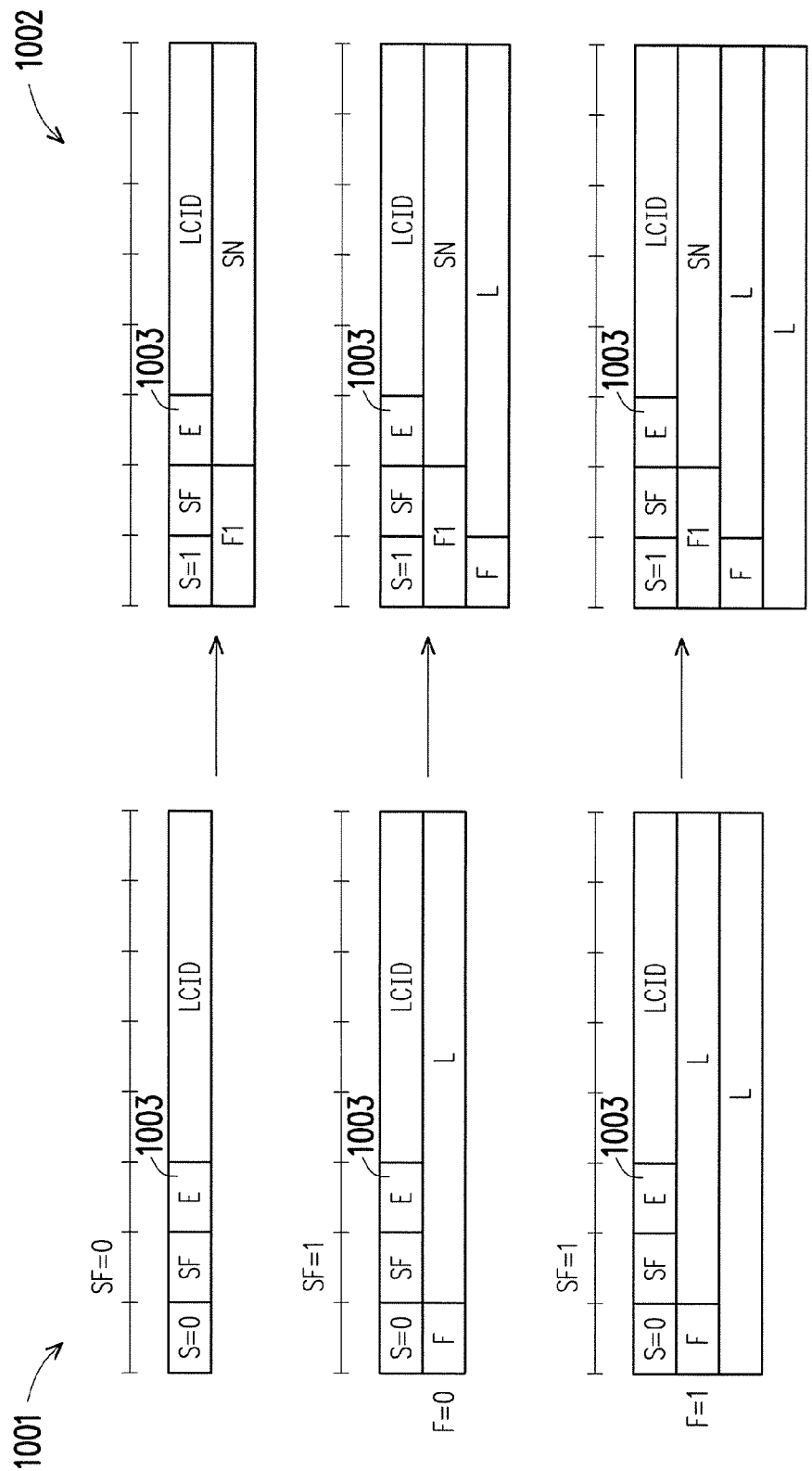
FIG. 10 illustrates MAC subheaders for non-segmented MAC SDU and MAC subheaders for segmented MAC SDU based on the fourth exemplary embodiment.

In the lowest L2 sublayer, MAC headers and subheaders could be generated based on the MAC header and subheader format as the current LTE MAC header and subheader format except that the L field might not be necessary since the length of PDUs are already known. Also the number of bits of each field could be different. A SF field could be included in MAC subheader to indicate whether a MAC SDU has a special size. The S field would indicate whether a MAC SDU has been segmented. MAC subheader formats for non-segmented MAC SDU is shown in the left side of FIG. 10, and the MAC subheaders formats of the segmented MAC SDU is shown in the right side of FIG. 10. The MAC subheader format 1001 for non-segmented MAC SDU is used for subheaders of fixed sized MAC SDUs, is used for the last subheader in a MAC PDU, and is used for subheads of fixed size MAC control elements as identified by LCID. The MAC subheader format 1002 for segmented MAC SDU is used for the last subheader in the MAC PDU. As shown in the right side of FIG. 10, the fourth exemplary embodiment proposes three new MAC subheaders for segmented SDUs. Similar to the third exemplary embodiment, the FI field would indicate whether a MAC SDU is segmented at the beginning and/or at the end. Also before the reception of the UL grant, the MAC subheader of each MAC SDU (and segmented MAC SDU) would be generated in the lowest L2 sublayer with E field (1003) automatically set as '1' to indicate that all the MAC SDUs would be followed by other MAC SDUs.

RT processing is performed in response to receiving the UL grant. During the RT processing, the LCP procedure would be performed. The LCP procedure could be the same as the current LTE LCP procedure. After the LCP procedure, if MAC SDU segmentation is deemed necessary, a new MAC subheader would be generated to replace the existed MAC subheader only for the segmented MAC SDU. Else, if padding is deemed necessary, then padding subheader and padding bits would be generated. If padding is not deemed necessary, then the E field (1003) of the last subheader in the MAC PDU would be changed from '1' to '0'.

The advantage of the fourth exemplary embodiment would include a good user plane latency as the RT processing is minimized in exchange for a larger header overhead. But the header overhead would be a non-factor if the majority of traffic types are small data. Moreover, no padding bits are needed while RT segmentation is performed.

For the fifth exemplary embodiment (e.g. FIG. 5), one of the main features is that different logical channels could be preconfigured with different treatments or processing techniques for UL data packets by an upper layer which, for example, could be accomplished by radio resource control (RRC). For example, FIG. 5 shows that each of the four channels could be preconfigured with different processing techniques for UL data packets as LCH 1 is preconfigured to require both NRT segmentation/concatenation and RT segmentation, LCH 2 requires NRT segmentation/concatenation but not RT segmentation, LCH 3 requires no NRT segmentation/concatenation but requires RT segmentation, and LCH 4 requires neither NRT segmentation/concatenation nor RT segmentation. Different channels could be (dynamically) configured by RRC based on the QoS requirement of each channel. For example, LCH 4 might not need NRT segmentation/concatenation and RT segmentation since reassembling segmented URLLC packets may result in extra processing latency at the receiver side.

In the (at least one) higher L2 sublayer, the PDUs of each logical channel can be generated as MAC SDUs based on the techniques preconfigured by the upper layer before the reception of the UL grant which corresponds to the UL data to be transmitted. Such technique could be any one of the previously described techniques of exemplary embodiments one through four.

In the lowest L2 sublayer, the lowest L2 sublayer may generate MAC subheader of each MAC SDU (and segmented MAC SDU) with E field (701, 704, 804, 1003)=1 before the reception of the UL grant. After the reception of the UL grant, RT processing would begin. The LCP procedure could be performed by following the current LTE LCP procedure until a MAC SDU cannot be filled in a TB. Under such circumstance, if the MAC SDU can be segmented, then segmentation would be performed as previously described. Otherwise, the LCP procedure of the first exemplary embodiment could be utilized to find other MAC SDUs to minimize the needed padding bits. If segmentation is needed for the MAC SDU which has been found and can be segmented, then segmentation is performed for the MAC SDU.

Figure 11:
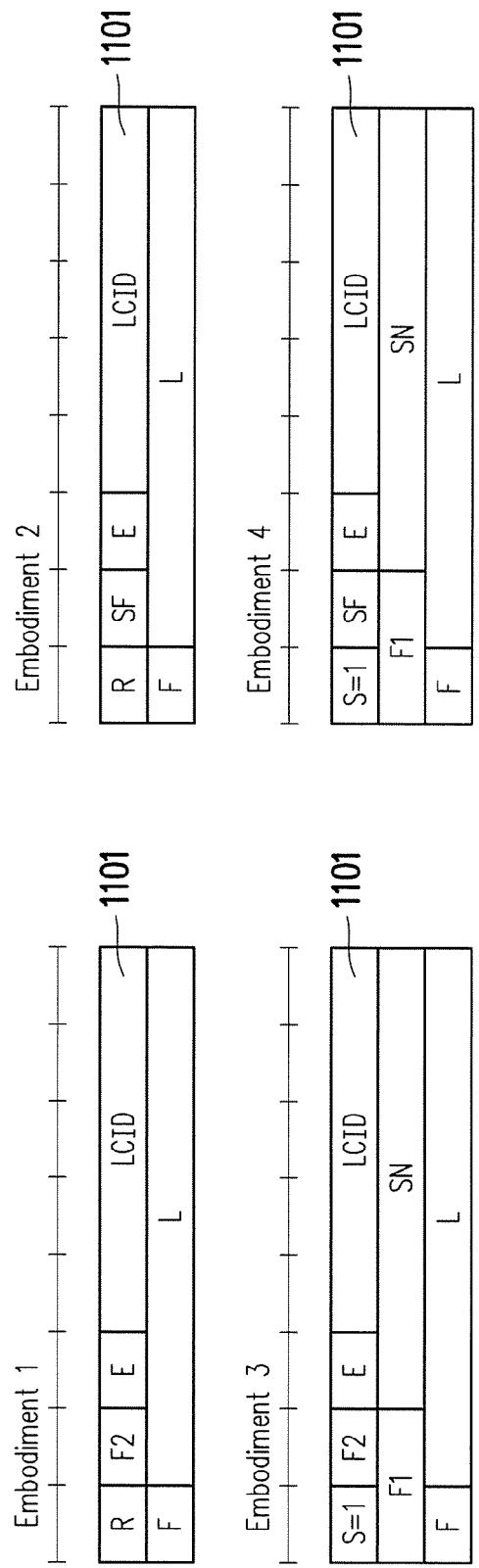
FIG. 11 illustrates treatments for the received MAC subheaders and MAC SDUs based on LCID at the receiver side in accordance with the fifth exemplary embodiment.

It is worth noting that the receiver would be able to know the format of each of the received MAC subheaders and hence the proper processing technique for the MAC SDUs based on the logical channel identification (LCID) (1101) field. As shown in FIG. 11, regardless of which exemplary embodiment has been implemented, the receiver would know that the last 5 bits of the first byte is the LCID (1101) field whenever the receiver side receives a MAC PDU. Based on the LCID (1101), the receiver would know which MAC subheader format is to be used as the mapping relationship between a LCID (1101) and the MAC subheader format which corresponds to the LCID (1101) has been preconfigured by the higher layer such as by RRC signaling.

Overall, some of the concepts of the disclosed method of L2 layer data packet processing may include performing RT segmentation in the lowest L2 sublayer after receiving the UL grant, performing NRT segmentation/concatenation in the higher L2 sublayer(s) before receiving the UL grant, configuring logical channels with different processing techniques for UL data packets by the upper layer such that the receiver side may perform the corresponding treatments for the received MAC subheaders and MAC SDU based on the LCID, pre-constructing RLC PDU and MAC subheaders before receiving the UL grant, and modifying the last subheader within the PDU if necessary.

In view of the aforementioned descriptions, the present disclosure is suitable for being used in a wireless communication system and is able to reduce user plane latency by minimizing RT processes to be performed after the reception of the UL grant associated with uplink data packets to transmitted by an electronic device.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method of data packets processing applicable to an electronic apparatus, the method comprising:
    generating, by a higher L2 sublayer before receiving an uplink (UL) grant, protocol data units (PDUs) of the higher L2 sublayer, wherein each PDU of the higher L2 sublayer comprises one or more SDUs of the higher L2 sublayer;
    generating, by a lowest L2 sublayer before receiving the UL grant, subheaders for each of service data units (SDUs) of the lowest L2 sublayer, wherein each SDU of the lowest L2 sublayer is equivalent to each PDU of the higher L2 sublayer;
    performing, by the lowest L2 sublayer, a logical channel prioritization (LCP) procedure for the SDUs in response to receiving the UL grant;
    generating, by the lowest L2 sublayer based on a result of the LCP procedure, a PDU of the lowest L2 sublayer by multiplexing a portion of the SDUs of the lowest L2 sublayer and the subheaders of the portion of the SDUs; and
    modifying, by the lowest L2 sublayer, the last subheader within the PDU.

2. The method of claim 1, wherein the PDUs of the higher L2 sublayer are radio link control (RLC) PDUs and the SDUs of the lowest L2 sublayer are medium access control (MAC) SDUs.

3. The method of claim 2, wherein generating, by the lowest L2 sublayer before receiving the UL grant, the subheaders for each of the SDUs of the lowest L2 sublayer comprising:
    generating, by the MAC sublayer before receiving the UL grant, the subheaders for each of the MAC SDUs with an extension (E) fields of all of the subheaders set to 1.

4. The method of claim 2, wherein performing, by the lowest L2 sublayer, a LCP procedure for the SDUs in response to receiving the UL grant comprising:
    determining, in real time after receiving the UL grant, whether segmentation for a MAC SDU is needed or a padding bit is needed.

5. The method of claim 2, wherein modifying, by the lowest L2 sublayer, the last subheader within the PDU comprising:
    generating, in real time after receiving the UL grant, a new MAC subheader for a MAC SDU to replace a previous MAC subheader of the MAC SDU if segmentation for the MAC SDU is needed.

6. The method of claim 2, wherein modifying, by the lowest L2 sublayer, the last subheader within the PDU comprising:

generating, in real time after receiving the UL grant, a padding subheader and the padding bit for the MAC PDU if the padding bit is needed.

7. The method of claim 2, wherein modifying, by the lowest L2 sublayer, the last subheader within the PDU comprising:

modifying, in real time after receiving the UL grant, last of the subheaders of the MAC PDU by changing the E field of the last of the subheaders from 1 to 0 if both the segmentation and the padding bit are not needed.

8. The method of claim 2 further comprising:

generating a first plurality of MAC SDUs for a first logical channel based on a first configuration of a radio resource control (RRC) signaling, wherein the first plurality of MAC SDUs comprises a segmented MAC SDU;

generating a second plurality of MAC SDUs for a second logical channel based on a second configuration of the RRC signaling, wherein the second plurality of MAC SDUs does not comprise any segmented MAC SDUs;

generating subheaders for each of the first plurality of MAC SDUs;

generating subheaders for each of the second plurality of MAC SDUs, wherein a first logical channel identifier (LCID) in first byte of each of subheaders of the first plurality of MAC SDUs is different from a second LCID of first byte of each of subheaders of the second plurality of MAC SDUs; and processing, by a receiver, received MAC SDUs based on the first LCID or the second LCID of a plurality of possible LCIDs.

9. An electronic device comprising:

a receiver; and a processor coupled to the receiver and configured to:

generate, by a higher L2 sublayer before receiving an uplink (UL) grant, protocol data units (PDUs) of the higher L2 sublayer, wherein each PDU of the higher L2 sublayer comprises one or more SDUs of the higher L2 sublayer;

generate, by a lowest L2 sublayer before receiving the UL grant, subheaders for each of service data units (SDUs) of the lowest L2 sublayer, wherein each SDU of the lowest L2 sublayer is equivalent to each PDU of the higher L2 sublayer;

perform, by the lowest L2 sublayer, a logical channel prioritization (LCP) procedure for the SDUs in response to receiving the UL grant from the receiver;

generate, by the lowest L2 sublayer based on a result of the LCP procedure, a PDU of the lowest L2 sublayer by multiplexing a portion of the SDUs of the lowest L2 sublayer and the subheaders of the portion of the SDUs; and modify, by the lowest L2 sublayer, the last subheader within the PDU.

10. The device of claim 9, wherein the PDUs of the higher L2 sublayer are radio link control (RLC) PDUs and the SDUs of the lowest L2 sublayer are medium access control (MAC) SDUs.

11. The device of claim 10, wherein the processor is configured to generate, by the lowest L2 sublayer before receiving the UL grant, the subheaders for each of the SDUs of the lowest L2 sublayer comprising:

generate, by the MAC sublayer before receiving the UL grant from the receiver, the subheaders for each of the MAC SDUs with an extension (E) fields of all of the subheaders set to 1.

12. The device of claim 10, wherein the processor is configured to perform, by the lowest L2 sublayer, a LCP procedure for the SDUs in response to receiving the UL grant comprising:

determine, in real time after receiving the UL grant, whether segmentation for a MAC SDU is needed or a padding bit is needed.

13. The device of claim 10, wherein the processor is configured to modify, by the lowest L2 sublayer, the last subheader within the PDU comprising:

generate, in real time after receiving the UL grant, a new MAC subheader for a MAC SDU to replace a previous MAC subheader of the MAC SDU if segmentation for the MAC SDU is needed.

14. The device of claim 10, wherein the processor is configured to modify, by the lowest L2 sublayer, the last subheader within the PDU comprising:

generate, in real time after receiving the UL grant, a padding subheader and the padding bit for the MAC PDU if the padding bit is needed.

15. The device of claim 10, wherein the processor is configured to modify, by the lowest L2 sublayer, the last subheader within the PDU comprising:

modify, in real time after receiving the UL grant, last of the subheaders of the MAC PDU by changing the E field of the last of the subheaders from 1 to 0 if both the segmentation and the padding bit are not needed.

16. The device of claim 10, wherein the processor is further configured to:

generate a first plurality of MAC SDUs for a first logical channel based on a first configuration of a radio resource control (RRC) signaling, wherein the first plurality of MAC SDUs comprises a segmented MAC SDU;

generate a second plurality of MAC SDUs for a second logical channel based on a second configuration of the RRC signaling, wherein the second plurality of MAC SDUs does not comprise any segmented MAC SDUs;

generate subheaders for each of the first plurality of MAC SDUs;

generate subheaders for each of the second plurality of MAC SDUs, wherein a first logical channel identifier (LCID) in first byte of each of subheaders of the first plurality of MAC SDUs is different from a second LCID of first byte of each of subheaders of the second plurality of MAC SDUs; and process, via the receiver, received MAC SDUs based on the first LCID or the second LCID of a plurality of possible LCIDs.

* * * * *